United States Patent [19]

Correia et al.

[11] 4,018,880

[45] Apr. 19, 1977

[54] METHOD OF PURIFYING HYDROGEN CHLORIDE GAS

[75] Inventors: Yves Correia, Saint-Auban; Jean Lesparre, Volonne, both of France

[73] Assignee: Rhone-Progil, Courbevoie, France

[22] Filed: Nov. 25, 1974

[21] Appl. No.: 526,747

[30] Foreign Application Priority Data

Nov. 27, 1973  France ................... 73.42141

[52] U.S. Cl. .................. 423/488; 423/481; 423/503
[51] Int. Cl.$^2$ .................................. C01B 7/08
[58] Field of Search ................. 423/488, 481

[56] References Cited

UNITED STATES PATENTS

| | | | |
|---|---|---|---|
| 2,196,246 | 4/1940 | Brown et al. | 423/488 |
| 3,446,586 | 5/1969 | Young | 423/488 |

OTHER PUBLICATIONS

B315,397, Jan. 1975, Rideout et al., 423/488 X.
Degering et al. "An Outline of Organic Chem.," Rev. Ed., 1937, p. 29. Barnes & Noble, Inc., N.Y.

*Primary Examiner*—Edward Stern
*Attorney, Agent, or Firm*—McDougall, Hersh & Scott

[57] ABSTRACT

The invention concerns a method of purifying hydrogen chloride gas containing small quantities of chlorine. The purifying method comprises passing impure hydrogen chloride over carbon, at a temperature from 30° to 200° C, in the presence of at least one olefin, possibly containing chlorine. The method of the invention applies particularly to the hydrogen chloride obtained from a chloroethane cracking operation initiated by chlorine.

7 Claims, No Drawings

METHOD OF PURIFYING HYDROGEN CHLORIDE GAS

The invention concerns a method of purifying hydrogen chloride gas emanating particularly from a dehydrochlorinating reaction, in organic chemistry, where free chlorine is present.

It is known that the hydrogen chloride gas, which is liberated in various operations in organic chemistry, is frequently compressed for re-use in other operations. It sometimes happens that the impure acid contains small quantities of free chlorine. The presence of even traces of this halogen, usually accompanied by a certain amount of water, leads to substantial corrosion of the piping and compressor and may also cause parasitic reactions when the acid is subsequently used.

It has already been proposed to fix the chlorine contaminating the hydrogen chloride on iron filings in the presence of a large excess of water. The disadvantages of such a purifying process, described in author's certificate No. 78,454 (U.S.S.R.) are clear from the fact (a) that excess water is present and (b) that there is a danger of the ferric chloride formed being carried away; in the presence of water, this would cause corrosion of the walls or components of the apparatus.

A method of eliminating free chlorine contaminating hydrogen chloride gas has now been found, which counteracts the drawbacks mentioned above.

The invention comprises a method of purifying hydrogen chloride gas containing small quantities of free chlorine, wherein the impure hydrogen chloride is passed over active carbon at a temperature from 30° to 200° C in the presence of at least one olefin, possibly containing chlorine.

The gas to be treated may come from various sources although the method applies more particularly to the gases discharged from dehydrochlorinating reactions, in organic chemistry, carried out in the presence of chlorine, particularly thermal cracking of chloroethanes, e.g. tetra and pentachloroethanes, initiated by chlorine. Trichloroethylene, which is the main product of the reaction, is condensed before the other discharged non-condensed gases are treated in accordance with the invention. The presence of water in up to a few hundred parts per million by weight, relative to the hydrogen chloride, does not cause any trouble. The same applies to the usual constituents of such discharged mixtures, in traces or small quantities. Free chlorine may be present in appreciable quantities although — particularly in view of the heat liberated on purification — it is preferable for this halogen to be present in a weight ratio of less than 3% relative to the hydrogen chloride.

The active carbon used is advantageously selected with a specific surface area of 900 to 1600 m²/g and preferably from 1200 to 1400 m²/g. This area is measured by the well known method known by the initials "B.E.T.".

The temperature at which purification is carried out are from 30° to 200° C, although for technical ease it is advantageous to purify the gas from 90° to 130° C.

At high temperatures, the initial halogen compounds or those formed in situ, are found to be dehydrochlorinated.

The purification according to the invention is preferably carried out at atmospheric pressure. However, it can be carried out under higher pressure with comparable results if, for example, the purifying arrangement has to be incorporated in a pressurized circuit, provided that the pressure does not cause excessive condensation.

Since the compounds which are suitable for fixing free chlorine chiefly comprise monoolefins from $C_2$ to $C_4$, possibly substituted by chlorine, the proporation of such compounds required will vary according to their own reactivity. Generally the molecular ratio of olefin compounds to chlorine is advantageously from 1 to 10/1 and preferably from 1 to 5/1 when ethylene, propylene or butene or dichloroethylenes are used, while a ratio of 3 to 5/1 is preferable with the trichloroethylene. These compounds may be present in the initial mixture to be treated, or may be added before the gas is let into the reactor containing the porous filling, or at the same time as the gas. When substituted or unsubstituted olefins are added, these will clearly be selected with a view to the use to which the hydrogen chloride will be put.

The time spent by the mixture to be purified, in contact with the carbon and olefins at the temperatures mentioned above, may be very short. This time of contact, which is defined by the ratio of the volume of the zone filled with porous material to the volumetric flow rate of the gases reacted, at the reaction temperature, is from 1 to 50 seconds and advantageously less than 25 seconds when the temperature is within the preferred range.

The time of contact obviously depends on the reactivity of the unsaturated compound present, under the operating conditions observed.

A remarkable feature of such a purifying process is that no hydrogen chloride is found to disappear although it is in large excess relative to the free chlorine. The chlorine, on the other hand, disappears to such a point that none can be detected leaving the purifying arrangement.

The reactor used for such purification may take various forms and may particularly comprise a tube or nest of tubes. The porous filling is supported by a grating or a detachable grated basket, when the filling is in a fixed bed. A fluidized bed may equally be used.

Examples will now be given to illustrate the invention but these should not be regarded as limiting it.

EXAMPLE 1

Gases discharged from a tetrachloroethane cracking operation, pre-heated to 100° C following the condensation of the trichloroethylene formed, are passed into a heat-insulated cylindrical column made of ordinary steel. The column has an internal diameter of 150 cm, operates at 2 ATA and contains active carbon (trade name: AC 40, produced by CECA) with a specific surface area of 1300 m²/g to a height of 250 cm. The flow rate of the gases is such that their average time of contact with the carbon is 10 seconds.

The composition of the initial mixture of gases, by weight, is as follows:

Hydrogen chloride 92%; Trichloroethylene 7%; Chlorine 1%.

The composition of the mixture of gases after treatment, again by weight, is as follows:

Hydrogen chloride 92.45%; Trichloroethylene 5.15%;

Perchloroethylene 2%; pentachloroethane 0.4%.

No chlorine is detected.

By way of comparison the same operation is carried out in the absence of carbon; the quantity of chlorine present on discharge is substantially the same as at the beginning.

EXAMPLE 2

Hydrogen chloride discharged from a carbon tetrachloride — perchloroethylene works is passed into a graphite column containing the same quantity of the same carbon. Apart from the hydrogen chloride the gas contains 1.5% by weight of chlorine relative to the hydrogen chloride and traces of perchloroethylene and carbon tetrachloride (the proportion of these two compounds by weight relative to the hydrogen chloride being less than 0.01%). Sufficient ethylene is added to the mixture to bring the ethylene/chlorine molar ratio to 3/1. The mixture is fed into the column at a rate such that its time of contact with the carbon is 6 seconds and the temperature is 100° C. No chlorine can be detected when the gas leaves the column.

EXAMPLE 3

Using the same hydrogen chloride as in Example 2, sufficient vinyl chloride is added to it to bring the molar ratio vinyl chloride/chlorine to 3.33/1. The mixture is fed into the column at a rate such that its time of contact with the carbon is 6 seconds; the temperature of the carbon is 120° C. No chlorine is detected when the gas leaves the column (<100 ppm).

EXAMPLE 4

The same stream of gas is used as in Example 2 and sufficient vinylidene chloride is added to it to bring the molar ratio vinylidene chloride/chlorine to 3.3/1. The mixture is passed into the column at a rate such that its time of contact with the carbon is 6.3 seconds and the temperature in the reaction vessel is 110° C. The gas leaving the vessel contains less than 100 ppm of chlorine.

EXAMPLE 5

The same stream of gas is used as in Example 2 and sufficient of a mixture of cis and trans 1,2-dichloroethylene is added to it to bring its molar ratio to chlorine to 4/1. The mixture is passed into the column at a flow rate such that its time of contact with the carbon is 9 seconds and the temperature in the reaction vessel is 130° C. When the gas leaves the vessel there is less than 100 ppm of chlorine present.

EXAMPLE 6

The column used in Example 1 is filled to a height of 250 cm with active carbon having a specific surface area of 950 m²/g (trade name: R III CA, produced by NORIT). Into this column there is passed a mixture, pre-heated to 100° C, emanating from a tetrachloroethane cracking operation initiated by chlorine, following the condensation of the chlorine-containing hydrocarbons. The weight of compounds other than hydrogen chloride contained in the mixture relative to the hydracid is as follows: 1.5% chlorine, 9% trichloroethylene, 0.4% vinylidene chloride and traces of other chlorine-containing solvents; the flow rate of the mixture is such that its time of contact with the carbon is 12 seconds. The operation is continued for 1800 hours. The hydrogen chloride gas analyzed on discharge contains no perceptible trace of free chlorine even at the end of the operation.

EXAMPLE 7

The column used in Example 1 is filled to a height of 250 cm with silica with a specific surface area of 200 m²/g (trade name SOA 200, produced by Rhone-Progil). A mixture obtained from a works where tetrachloroethane is cracked, initiated by chlorine, is fed into this column. The mixture is tapped from the cracking works following the condensation of the chlorine-containing hydrocarbons and is pre-heated to 125° C. The weight of compounds other than hydrogen chloride contained in the mixture relative to the hydracid is as follows: 1.3% chlorine, 14.5% trichloroethylene, 0.4% vinylidene chloride and traces of other chlorine-containing solvents; the flow rate of the mixture is such that its time of contact with the silica is 8 seconds. The hydrogen chloride gas analyzed on discharge still contains 1% of chlorine.

We claim:

1. A method of purifying hydrogen chloride gas containing small quantities of free chlorine, without removal of hydrogen chloride, consisting essentially of adding at least one olefin to the impure hydrogen chloride in an amount to provide a molar ratio of olefin to free chlorine within the range of 10-1 moles of olefin to 1 mole of free chlorine, and passing the mixture in a gaseous state over activated carbon at a temperature within the range of 30° to 200° C.

2. The method of claim 1, characterized in that the active carbon used has a specific surface area of 900 to 1600 m²/g.

3. The method of claim 1, characterized in that purification takes place in the presence of at least one compound with ethylene unsaturation, selected from the group consisting of monoolefins with 2 to 4 carbon atoms and their substituted chlorine-containing derivatives.

4. The method of claim 1, characterized in that the olefin used is selected from the group consisting of ethylene, propylene and butenes.

5. The method as claimed in claim 1 in which the olefin contains chlorine.

6. The method as claimed in claim 1 in which the activated carbon has a specific surface area of 1200 to 1400 m²/g.

7. The method as claimed in claim 1 in which the molar ratio of olefin compounds to chlorine is 1 to 5/1.

* * * * *